(12) United States Patent
Huang et al.

(10) Patent No.: US 7,916,240 B2
(45) Date of Patent: Mar. 29, 2011

(54) BACKLIGHT MODULE WITH ELASTIC BUCKLING STRUCTURES AND LIQUID CRYSTAL DISPLAY DEVICE USING SAME

(75) Inventors: Sin-Tung Huang, Miao-Li (TW); Chao Liang, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 636 days.

(21) Appl. No.: 11/999,237

(22) Filed: Dec. 3, 2007

(65) Prior Publication Data

US 2008/0129921 A1     Jun. 5, 2008

(30) Foreign Application Priority Data

Dec. 1, 2006    (TW) ............................... 95144737 A (51) Int. Cl.
     *G02F 1/1333*     (2006.01)
     *G02F 1/1335*     (2006.01)

(52) U.S. Cl. ............................... 349/60; 349/58; 349/61
(58) Field of Classification Search ............... 349/58–64
See application file for complete search history.

(56) References Cited

U.S. PATENT DOCUMENTS

| 6,976,781 | B2 | 12/2005 | Chu et al. | |
| 7,551,241 | B2* | 6/2009 | Fukuda | 349/58 |
| 2006/0054475 | A1* | 3/2006 | Galvin et al. | 200/5 R |

FOREIGN PATENT DOCUMENTS

CN         1188903 A     7/1998

* cited by examiner

*Primary Examiner* — Dung T. Nguyen
(74) *Attorney, Agent, or Firm* — Wei Te Chung (57) ABSTRACT

An exemplary backlight module (300) includes a frame (350) and a bottom plate (370). One of the frame and the bottom plate includes a plurality of elastically deformable buckling structures (358), and the other of the frame and the bottom plate includes a plurality of protrusions (204, 374) corresponding to the buckling structures. When the bottom plate is attached to the frame, the bottom plate and the frame are pressed together along a first axis, and the buckling structures elastically deform and then elastically rebound such that the buckling structures are engaged with the protrusions and the bottom plate is fixed to the frame.

20 Claims, 6 Drawing Sheets

BACKLIGHT MODULE WITH ELASTIC BUCKLING STRUCTURES AND LIQUID CRYSTAL DISPLAY DEVICE USING SAME

CROSS-REFERENCE TO RELATED APPLICATION

This application is related to, and claims the benefit of, a foreign priority application filed in Taiwan as Application No. 95144737 on Dec. 1, 2006. The related application is incorporated herein by reference.

FIELD OF THE INVENTION

The present invention relates to backlight modules and liquid crystal display (LCD) devices using backlight modules, and more particularly to a backlight module that can be assembled conveniently.

GENERAL BACKGROUND

Liquid crystal display devices are commonly used as display devices for compact electronic apparatuses, because they not only are very thin but also provide good quality images with little power consumption.

Figure 9:
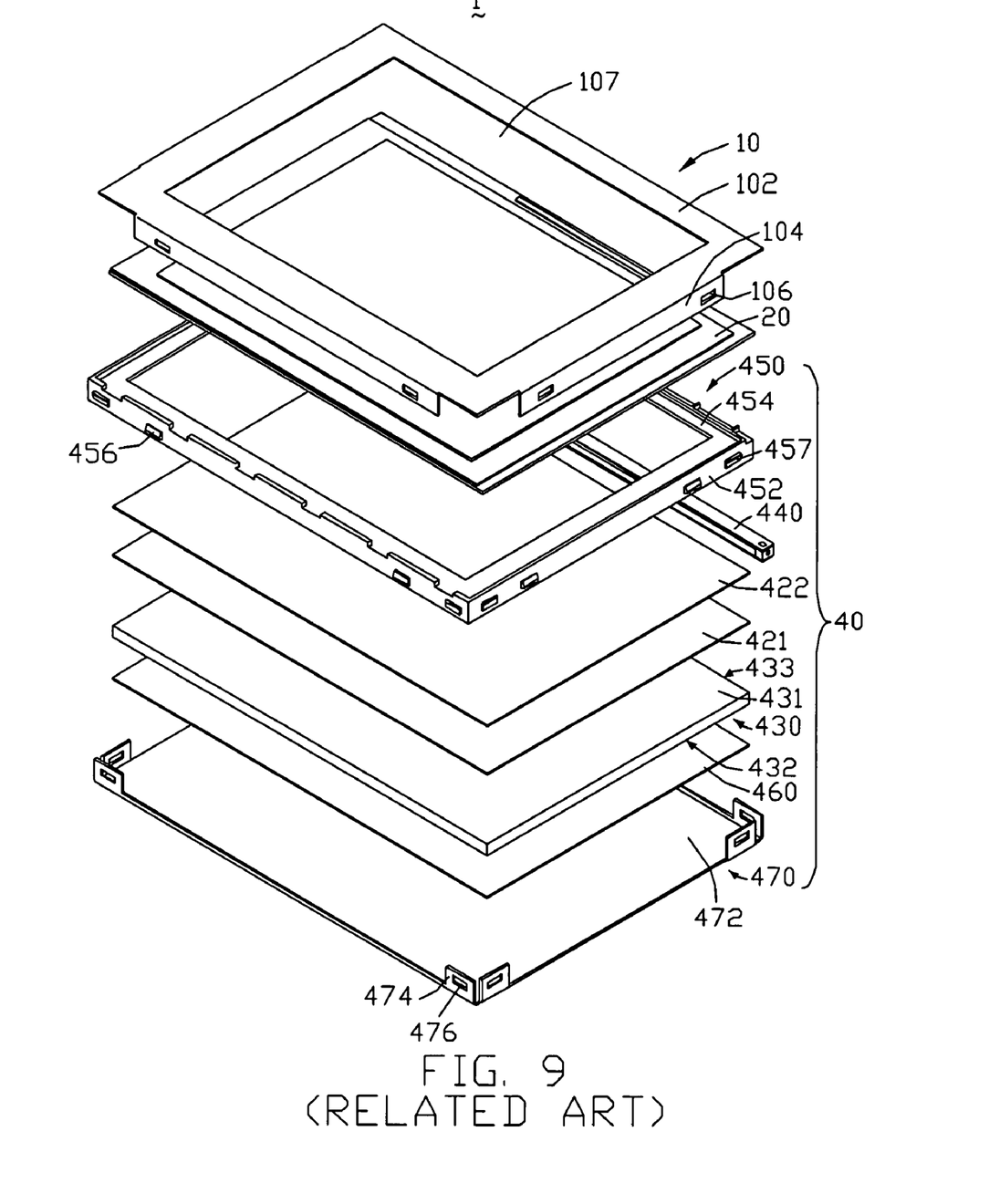
FIG. 9 is an exploded, isometric view of a conventional LCD device.

FIG. 9 shows an exploded, isometric view of a typical LCD device 1. The LCD device 1 includes a bezel 10, a liquid crystal panel 20, and a backlight module 40 disposed adjacent to the liquid crystal panel 20.

The bezel 10 includes a generally rectangular top plate 102, and four first side walls 104 extending downward from four edges of the top plate 102. The top plate 102 defines an essentially rectangular display region 107 thereof. Each first side wall 104 defines two first notches 106 therein.

The backlight module 40 includes a brightness enhancement film (BEF) 422, a diffusion film 421, a light guide plate (LGP) 430, an illuminator 440, a reflection film 460, a frame 450, and a bottom tray 470. The frame 450, the BEF 422, the diffusion film 460, the LGP 430, and the reflection film 460 are arranged in that order from top to bottom.

The LGP 430 includes a top light incident surface 433, a light emitting surface 431 adjoining the light incident surface 433, and a bottom surface 432 adjoining the light incident surface 433. The illuminator 440 is positioned opposite the light incident surface 433.

The frame 450 includes four second side walls 452 arranged end to end, and a supporting board 454. Each second side wall 452 includes two first protrusions 456 and two second protrusions 457 integrally extending perpendicularly outwardly from an outer surface (not labeled) thereof. The supporting board 454 has a frame shape, and integrally extends perpendicularly inward from inner surfaces (not labeled) of the second side walls 452. The frame 450 therefore defines an upper space for accommodating the liquid crystal panel 20, and a lower space for accommodating the BEF 422, the diffusion film 421, the LGP 430 and the reflection film 460. The first protrusions 456 correspond in position to the first notches 106.

The bottom tray 470 includes a bottom wall 472 and eight side plates 474. The side plates 474 extend perpendicularly upward from four sides of the bottom wall 472. Two side plates 474 are located at each of four corners of the bottom tray 470, respectively. Each side plate 474 defines a second notch 476, corresponding to one of the second protrusions 457 of a respective second side wall 452 of the frame 450.

When the LCD device 1 is assembled, the BEF 422, the diffusion film 421, the LGP 430, and the reflection film 460 are received in the lower space. The second protrusions 457 of the second side walls 452 of the frame 450 are engagingly received in the second notches 476 of the bottom tray 470. Thereby, the frame 450 and the bottom tray 470 are locked together. The liquid crystal panel 20 is received in the upper space. The first protrusions 456 are engagingly received in the first notches 106, and the frame 450 and the bezel 10 are thereby locked together.

When the LCD device 1 is assembled, this is typically performed manually by a human operator. The bottom tray 470 and the frame 450 are generally locked together by force applied in four different directions corresponding to the four second side walls 452. The bezel 10 and the frame 450 are generally locked together by force applied in four different directions corresponding to the four second side walls 452. Thus assembly or disassembly of the LCD device 1 is somewhat complicated, problematic, and time-consuming. In addition, a size of each first protrusion 456 is usually slightly less than a size of each corresponding first notch 106, in order to facilitate assembly. However, this may result in loose engagement of the first protrusions 456 in the first notches 106. Similarly, a size of each second protrusion 457 is usually slightly less than a size of each corresponding second notch 476, in order to facilitate assembly. However, this may result in loose engagement of the second protrusions 457 in the second notches 476.

What is needed, therefore, is a backlight module and a liquid crystal display device using the backlight module that can overcome the above-described deficiencies.

SUMMARY

In one embodiment, a backlight module includes a frame and a bottom plate. One of the frame and the bottom plate includes a plurality of elastically deformable buckling structures, and the other of the frame and the bottom plate includes a plurality of protrusions corresponding to the buckling structures. When the bottom plate is attached to the frame, the bottom plate and the frame are pressed together along a first axis, and the buckling structures elastically deform and then elastically rebound such that the buckling structures are engaged with the protrusions and the bottom plate is fixed to the frame.

In another embodiment, a liquid crystal display device includes a liquid crystal panel and a backlight module. The backlight module includes a frame and a bottom plate. One of the frame and the bottom plate includes a plurality of elastically deformable buckling structures, and the other of the frame and the bottom plate includes a plurality of protrusions corresponding to the buckling structures. When the bottom plate is attached to the frame, the bottom plate and the frame are pressed together along a first axis, and the buckling structures elastically deform and then elastically rebound such that the buckling structures are engaged with the protrusions and the bottom plate is fixed to the frame.

Other novel features and advantages will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments in detail.

Figure 1:
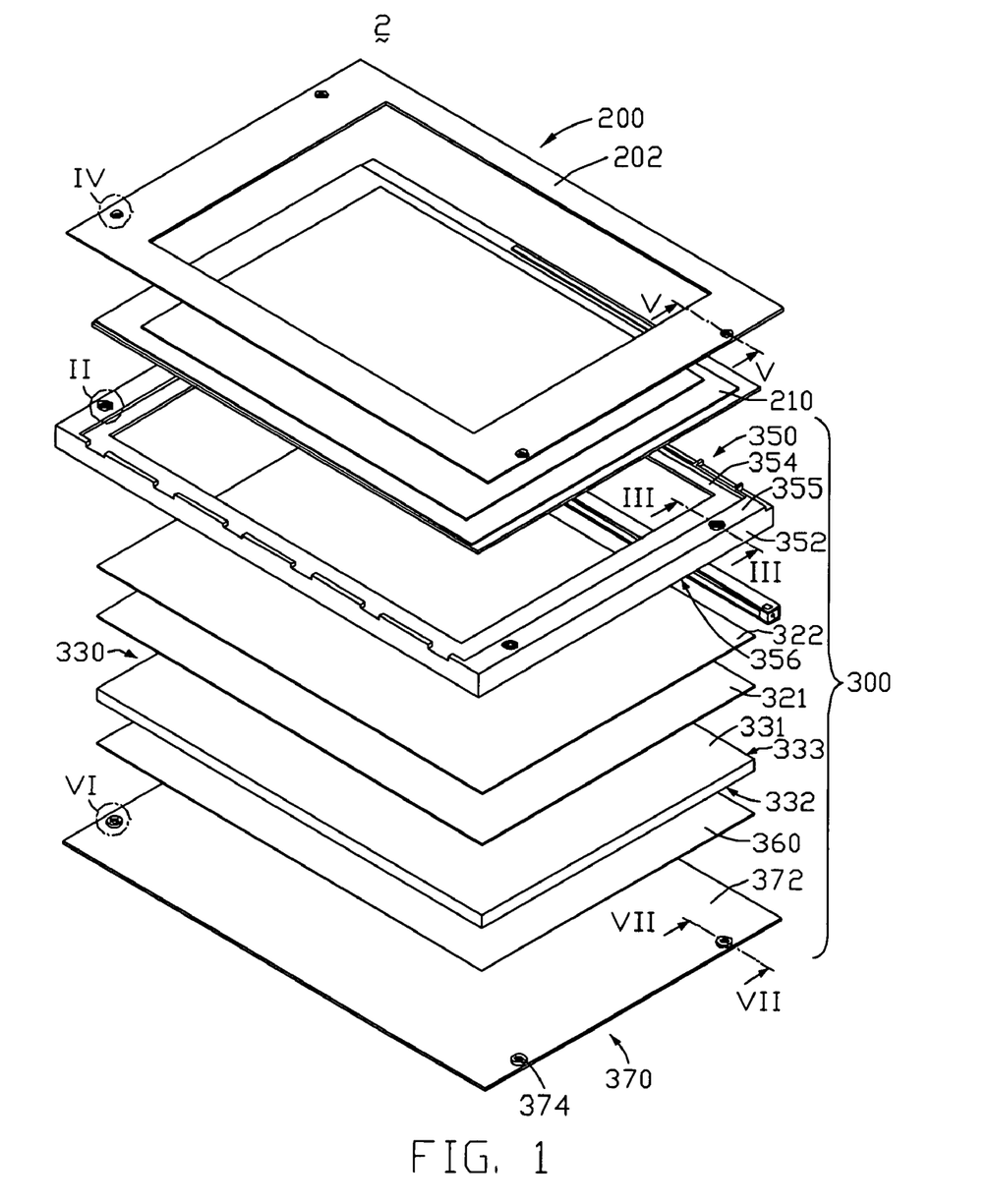
FIG. 1 is an exploded, isometric view of an LCD device according to an exemplary embodiment of the present invention, the LCD device including a bezel, a frame and a bottom plate.

Referring to FIG. 1, an exploded, isometric view of an LCD device according to an exemplary embodiment of the present invention is shown. The LCD device 2 includes a bezel 200, a liquid crystal panel 210, and a backlight module 300, arranged in that order from top to bottom.

The backlight module 300 includes a BEF 322, a diffusion film 321, an LGP 330, an illuminator (not labeled), a reflector 360, a frame 350, and a bottom plate 370. The BEF 322, the diffusion film 321, the LGP 330, the reflector 360 and the bottom plate 370 are arranged in that order from top to bottom.

The LGP 330 includes a top light incident surface 333, a light emitting surface 331 adjoining the light incident surface 333, and a bottom surface 332 adjoining the light incident surface 333. The illuminator is positioned opposite the light incident surface 333. The reflector 360 is positioned adjacent to the bottom surface 332.

The frame 350 includes four side walls 352 arranged end to end, and a supporting board 354. The supporting board 354 has a frame shape, and integrally extends perpendicularly inward from inner surfaces (not labeled) of the side walls 352. The supporting board 354 defines an opening for allowing light rays to pass therethrough.

Figure 2:
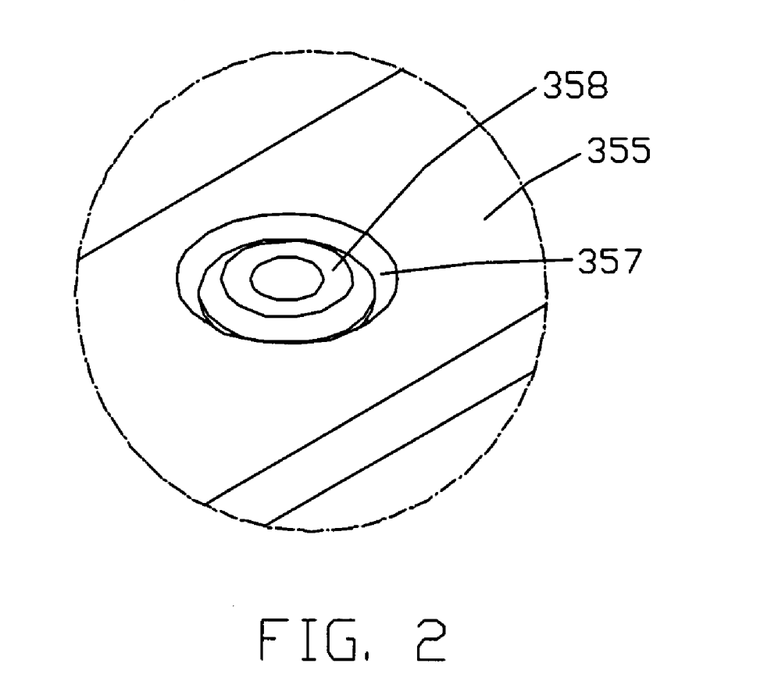
FIG. 2 is an enlarged view of a circled portion II of FIG. 1.
Figure 3:
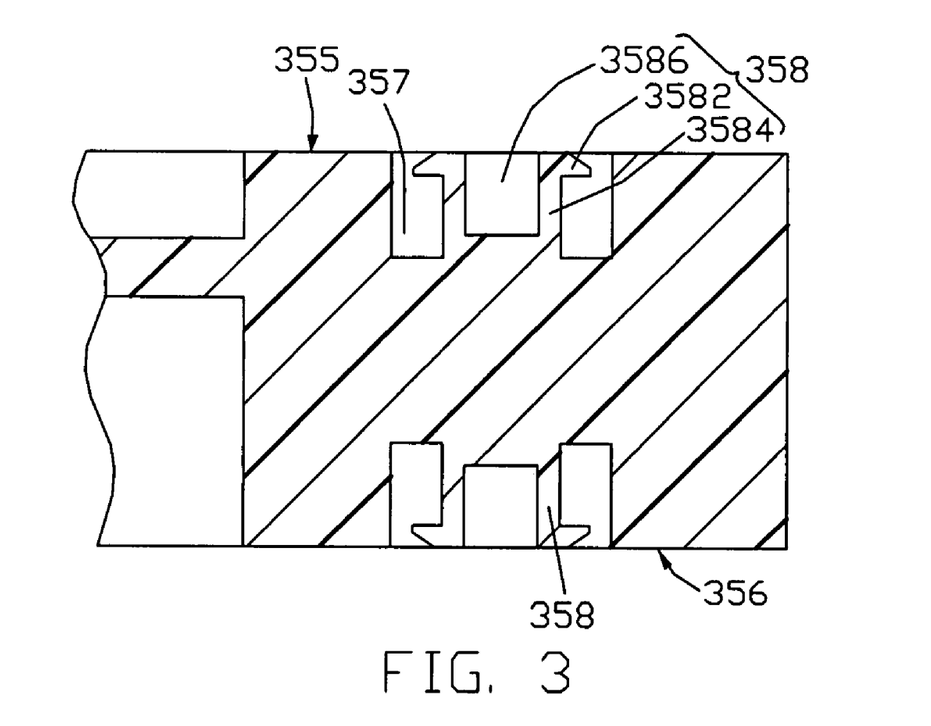
FIG. 3 is a cross-sectional view of part of the frame taken along line III-III of FIG. 1.

Referring also to FIG. 2 and FIG. 3, each of a pair of two opposite short side walls 352 includes an upside 355 and an underside 356. The short side walls 352 each define a plurality of first notches 357. The notches 357 are respectively located at the underside 356 and the upside 355 of each side wall 352. Each notch 357 at the upside 355 is directly above a corresponding notch 357 at the underside 356. The short side walls 352 each also include a plurality of buckling structures 358, which are located in the notches 357 respectively. The buckling structures 358 at the upsides 355 of the side walls 352 are essentially coplanar with the upsides 355. The buckling structures 358 at the undersides 356 of the side walls 352 are essentially coplanar with the undersides 356. Each of the buckling structures 358 includes a cap portion 3582 and a body portion 3584. The body portion 3584 extends vertically from a main body of the short side wall 352 at a bottom of the notch 357. The cap portion 3582 extends perpendicularly outwardly from a distal end of the body portion 3584. The body portion 3584 and the cap portion 3582 cooperatively define a hole 3586 therein. The buckling structure 358 therefore has a general shape of a hollow mushroom. The buckling structure 358 is elastically deformable. A height of the buckling structure 358 is generally equal to a depth of the notch 357. A depth of the hole 3586 is slightly less than the depth of the notch 357. An outer diameter of the cap portion 3582 is greater than an outer diameter of the body portion 3584. The buckling structures 358 can be made of plastic. In one embodiment, the buckling structures 358 and the frame 350 are made of the same plastic material. In another embodiment, the buckling structures 358 are made of suitable elastic material that is more elastically deformable than plastic.

Figure 4:
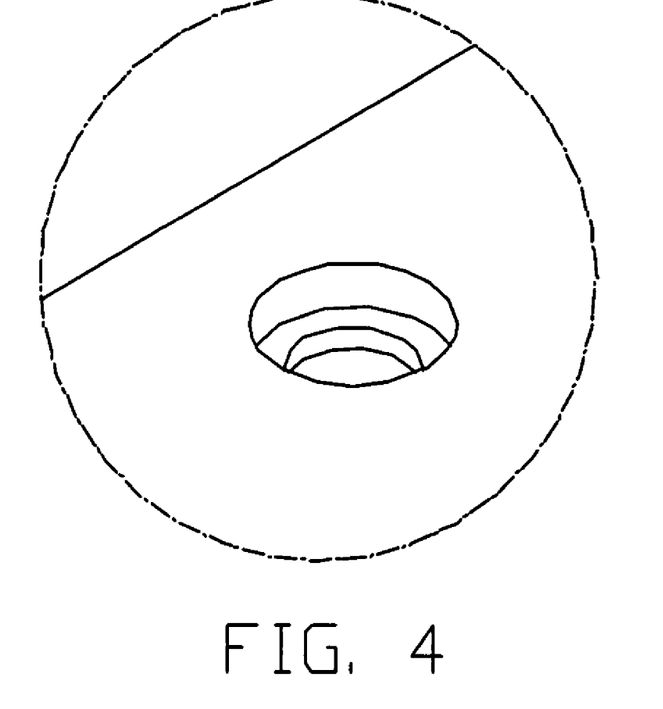
FIG. 4 is an enlarged view of a circled portion IV of FIG. 1.
Figure 5:
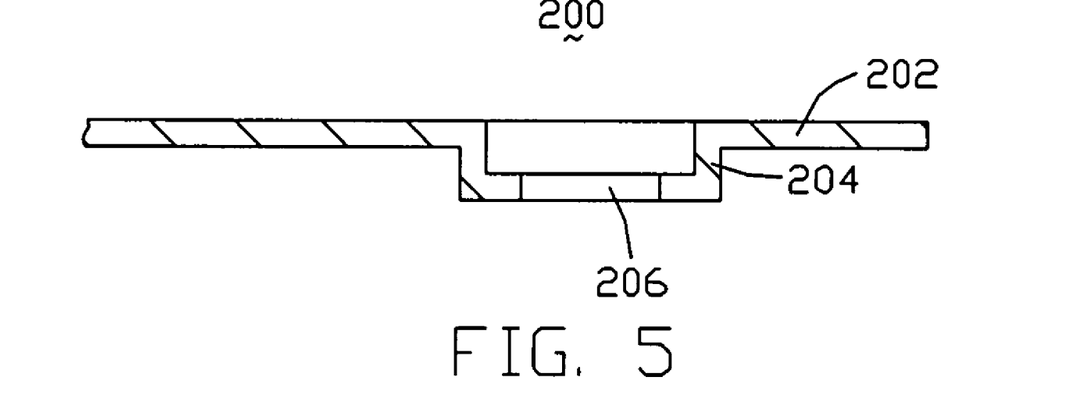
FIG. 5 is a cross-sectional view of part of the bezel taken along line V-V of FIG. 1.

Referring also to FIG. 4 and FIG. 5, the bezel 200 includes a generally rectangular top plate 202. The top plate 202 defines an opening (not labeled) that serves as a display region. The top plate 202 includes a plurality of depressed collars 204, thus defining a plurality of first hollows (not labeled) in the depressed collars 204. The first hollows are generally disc-shaped. Each of the depressed collars 204 defines a first through hole 206 therein. The first through holes 206 of the depressed collars 204 correspond to the buckling structures 358 located at the upsides 355 of the short side walls 352. The depressed collars 204 are essentially coplanar with one another. A diameter of each first through hole 206 is less than a diameter of the first hollow. A diameter of the first hollow is substantially equal to the outer diameter of the cap portion 3582 of the corresponding buckling structure 358.

Figure 6:
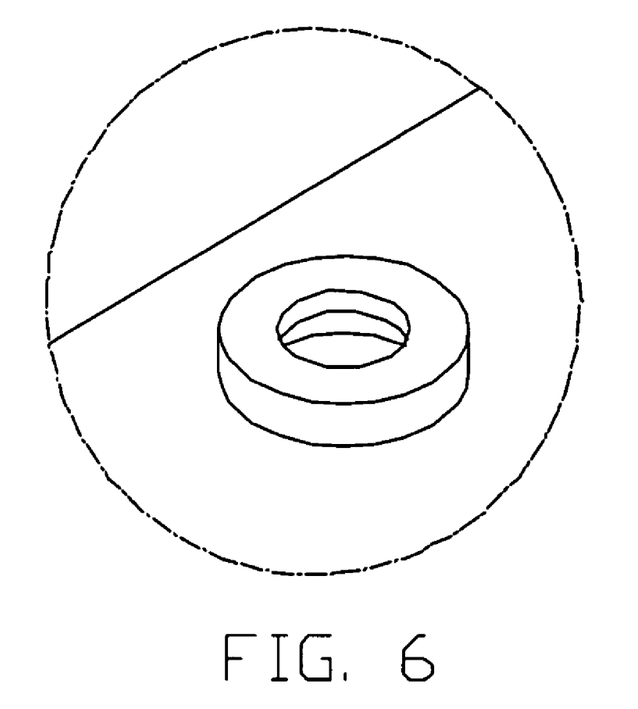
FIG. 6 is an enlarged view of a circled portion VI of FIG. 1.
Figure 7:
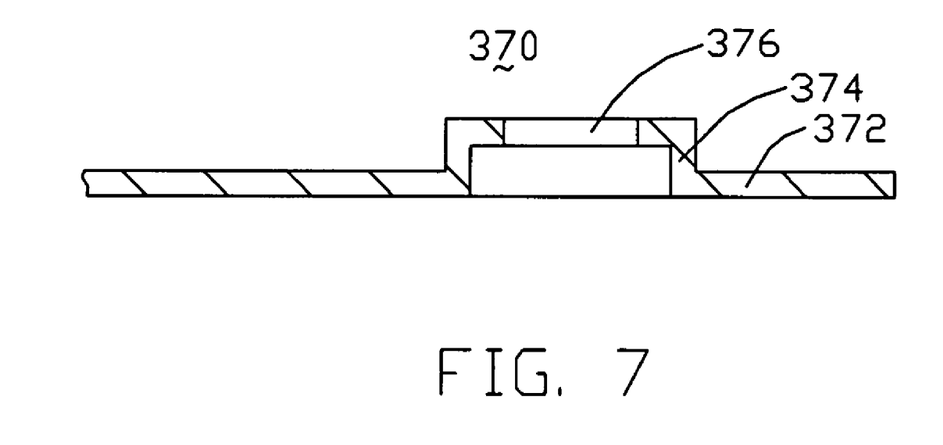
FIG. 7 is a cross-sectional view of part of the bottom plate taken along line VII-VII of FIG. 1.

Referring also to FIG. 6 and FIG. 7, the bottom plate 370 includes a generally rectangular main body 372. The main body 372 is substantially planar. The main body 372 includes a plurality of upraised collars 374, thus defining a plurality of second hollows in the upraised collars 374. The second hollows are generally disc-shaped. Each upraised collar 374 has a structure similar to each depressed collar 204. The upraised collar 374 defines a second through hole 376 therein. The second through holes 376 of the upraised collars 374 correspond to the buckling structures 358 located at the undersides 356 of the short side walls 352. The upraised collars 374 are essentially coplanar with one another. A diameter of each second through hole 376 is less than a diameter of the second hollow. A diameter of the second hollow is substantially equal to a diameter of the cap portion 3582 of the corresponding buckling structure 358. Thus the depressed collars 204 and the upraised collars 374 have essentially the same structure, with the depressed collars 204 being oriented symmetrically opposite the upraised collars 374.

Figure 8:
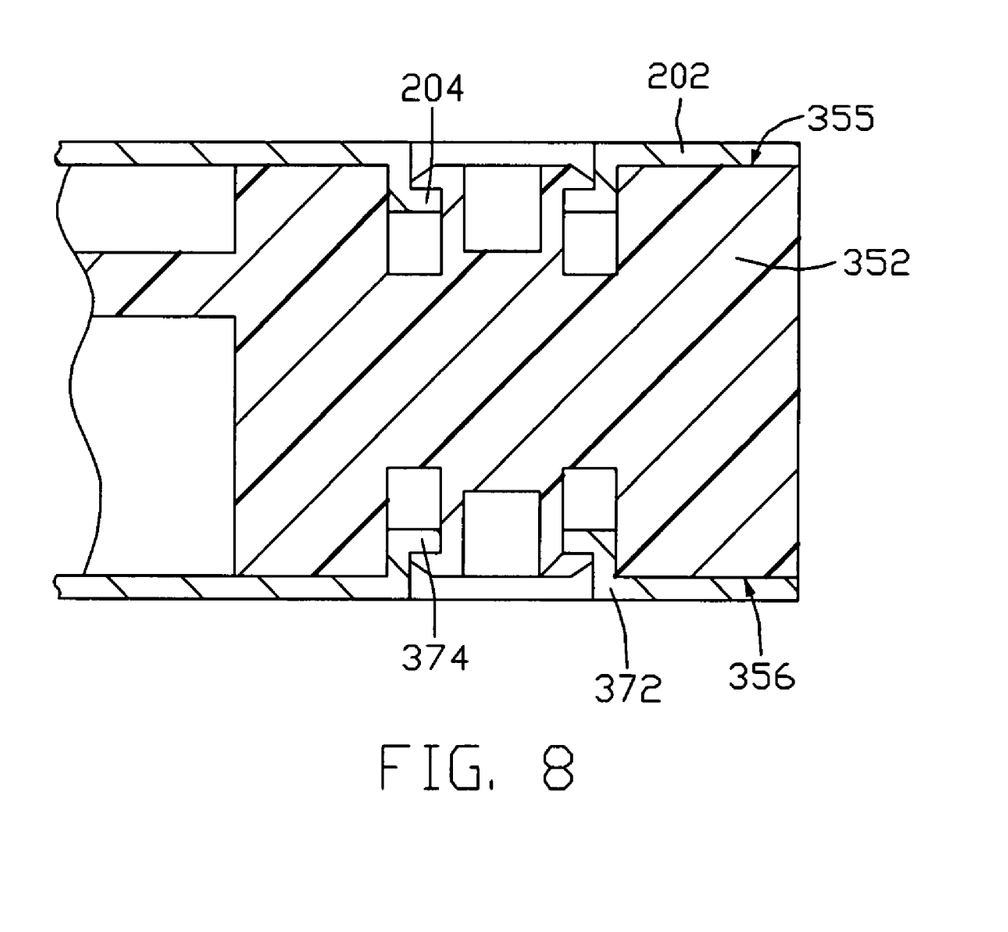
FIG. 8 is similar to FIG. 3, but also showing part of the bezel engaged with the frame, and part of the bottom plate engaged with the frame.

Referring also to FIG. 8, this shows engagement of the top plate 202 of the bezel 200 with the short side wall 352, and engagement of the main body 3722 of the bottom plate 370 with the short side wall 352, when the LCD device 2 is assembled. In a process of assembly of the LCD device 2, the liquid crystal panel 210 is received in a first accommodating space cooperatively defined by the bezel 200 and the frame 350. The BEF 322, the diffusion film 321, the LGP 333, the reflector 360 are received in a second accommodating space cooperatively defined by the frame 350 and the bottom plate 370.

The cap portions 3582 of the buckling structures 358 at the upsides 355 are vertically pressed into the first through holes 206 of the depressed collars 204, and therefore are elastically deformed inwardly. The cap portion 3582 of each buckling structure 358 passes through the corresponding first through hole 206. The cap portion 3582 then rebounds back to its original shape. The depressed collar 204 is thus substantially locked with the buckling structure 358 in the corresponding first notch 357. With all the buckling structures 358 at the upsides 355 being locked with the corresponding depressed collars 204, the top plate 202 firmly and securely abuts the upsides 355. The bezel 200 is restricted from sliding or being pulled off the frame 350. That is, relative movement of the bezel 200 and the frame 350 can be prevented. In this embodiment, the bezel 200 is locked with the frame 350.

The cap portions 3582 of the buckling structures 358 at the underside 356 are vertically pressed into the second through holes 376 of the upraised collars 374, and therefore are elastically deformed inwardly. The cap portion 3582 of each buckling structure 358 passes through the corresponding second through hole 376. The cap portion 3582 then rebounds back to its original shape. The upraised collar 374 is thus substantially locked with the buckling structure 358 in the corresponding first notch 357. With all the buckling structures 358 at the undersides 356 being locked with corresponding upraised collars 374, the main body 372 firmly and securely abuts the undersides 356. The bottom plate 370 is restricted from sliding or being pulled off the frame 350. That is, relative movement of the bottom plate 370 and the frame 350 can be prevented. In this embodiment, the bottom plate 370 is locked with the frame 350.

In summary, the bezel 200 is fixed to the frame 350 by engaging the depressed collars 204 with the corresponding buckling structures 358 of the short side walls 352. A pressing operation generally in vertical directions only is needed. The bottom plate 370 is fixed to the frame 350 by engaging the upraised collars 374 with the corresponding buckling structures 358 of the short side walls 352. A pressing operation generally in vertical directions only is needed. The bezel 200 and the backlight module 300 are therefore easily assembled into the LCD device 2. When the LCD device 2 is disassembled, the cap portions 3582 of the buckling structures 358 are elastically deformed inwardly, and pressed through the corresponding first and second through holes 206, 376. Thus each of the bezel 200 and the bottom plate 370 is detached from the frame 350, and the LCD device 2 can be easily fully disassembled. In addition, when the LCD device 2 is in the assembled state, because the cap portions 3582 are elastic, essentially no interspaces exist where the depressed collars 204 are engaged with the corresponding buckling structures 358, and essentially no interspaces exist where the upraised collars 374 are engaged with the corresponding buckling structures 358. Thus the LCD device 2 has good mechanical stability.

In alternative embodiments, each buckling structure 358 can have any of various other suitable forms. For example, the buckling structure 358 can have a partially or fully split configuration. In such case, the cap portion 3582 can include a pair of generally semi-annular or arcuate parts oriented symmetrically opposite each other. Preferably, the semi-annular or arcuate parts are separated by a gap. Alternatively, the cap portion 3582 can include three arc-shaped parts symmetrically arranged about a center thereof. Preferably, the arc-shaped parts are separated by three corresponding gaps. In another alternative embodiment, the buckling structures 358 can be disposed at the bezel 200 and the bottom plate 370 respectively, and the depressed collars 204 and the upraised collars 374 can be disposed at the frame 350 correspondingly.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, the backlight module comprising:
   a frame; and
   a bottom plate;
   wherein one of the frame and the bottom plate comprises a plurality of elastically deformable buckling structures, and the other of the frame and the bottom plate comprises a plurality of protrusions corresponding to the buckling structures; and
   when the bottom plate is attached to the frame, the bottom plate and the frame are pressed together along a first axis, and the buckling structures elastically deform and then elastically rebound such that the buckling structures are engaged with the protrusions and the bottom plate is fixed to the frame.

2. The backlight module in claim 1, wherein the frame comprises the buckling structures, and the bottom plate comprises the protrusions.

3. The backlight module in claim 2, wherein the frame further comprises:
   four side walls consecutively arranged end to end, wherein two of the four side walls opposite to each other are shorter than the other two side walls; and
   a frame-shaped supporting board extending perpendicularly inward from inner surfaces of the side walls.

4. The backlight module in claim 3, wherein the two short side walls define a plurality of notches on undersides respectively, the buckling structure being arranged at undersides of one pair of the side walls corresponding to the notches.

5. The backlight module in claim 4, wherein the buckling structure comprises a body portion extending vertically from a main body of the short side wall at a bottom of the notch, and a cap portion extending perpendicularly outwardly from a distal end of the body portion, the cap portion and the body portion cooperatively defining a hole thereof.

6. The backlight module in claim 2, wherein the bottom plate further comprises a main body, and the protrusions are in the form of collars extending up from the main body, thereby defining a plurality of hollows at a surface in the collars coplanar with the main body.

7. The backlight module in claim 6, wherein each of the collars defines a through hole therein.

8. The backlight module in claim 7, wherein a diameter of the through hole is less than an outer diameter of the hollow.

9. The backlight module in claim 6, wherein a diameter of the hollow is equal to a diameter of the cap portion of the buckling structure.

10. The backlight module in claim 2, wherein each of the buckling structures is locked with the corresponding protrusion.

11. The backlight module in claim 2, further comprising a plurality of optical films received in an accommodating space defined by the first fixing component and the second fixing component.

12. The backlight module in claim 2, wherein the buckling structures are substantially coplanar with a bottom surface of the frame, and the protrusions are substantially coplanar with each other.

13. The backlight module in claim 1, wherein each of the buckling structures is elastically deformable.

14. The backlight module in claim 1, wherein each of the buckling structures is in the general shape of a hollow mushroom.

15. A liquid crystal display device comprising:
    a liquid crystal panel; and
    a backlight module adjacent to the liquid crystal panel, the backlight module comprising:
       a frame; and
       a bottom plate;
       wherein one of the frame and the bottom plate comprises a plurality of elastically deformable first buckling structures, and the other of the frame and the bottom plate comprises a plurality of first protrusions corresponding to the buckling structures; and when the bottom plate is attached to the frame, the bottom plate and the frame are pressed together along a first axis, and the first buckling structures elastically deform and then elastically rebound such that the first buckling structures are engaged with the first protrusions and the bottom plate is fixed to the frame.

16. The liquid crystal display device in claim 15, wherein the frame comprises the first buckling structures, and the bottom plate comprises the first protrusions, each of the buckling structures comprising a cap portion and a body portion, the body portion extending upwardly from a bottom of the frame, the cap portion extending outwardly from an end of the body portion.

17. The liquid crystal display device in claim 16, wherein the bottom plate defines a plurality of disc-shaped hollows thereof, the first protrusions being disposed corresponding to the hollows and being protruding toward the corresponding first buckling structures, the first protrusions each defining a through hole thereof.

18. The liquid crystal display device in claim 16, further comprising a bezel adjacent to the liquid crystal display, the bezel and the bottom plate being at opposite sides of the backlight module, the bezel comprising a plurality of second protrusions, the frame further comprising a plurality of second buckling structures protruding toward the bezel and corresponding to the second protrusions of the bezel, each of the second buckling structures having a same structure as each of the first buckling structures.

19. The liquid crystal display device in claim 18, wherein when the bezel is attached to the frame, the bezel and the frame are pressed together along the first axis, and the second buckling structures elastically deform and then elastically rebound such that the second buckling structures are engaged with the second protrusions and the bezel is fixed to the frame.

20. The liquid crystal display device in claim 17, wherein a diameter of the through hole is less than a diameter of the hollow, and a diameter of the hollow is equal to a diameter of the cap portion of the buckling structure.

* * * * *